United States Patent
Piesinger (10) Patent No.: US 11,999,461 B2
(45) Date of Patent: Jun. 4, 2024

(54) ARTIFICIAL BUOYANCY LIFTING DEVICE USING COUPLED ELECTROSTATIC PISTONS METHOD AND APPARATUS

(71) Applicant: Gregory Hubert Piesinger, Cave Creek, AZ (US)

(72) Inventor: Gregory Hubert Piesinger, Cave Creek, AZ (US)

( * ) Notice: Subject to any disclaimer, the term of this patent is extended or adjusted under 35 U.S.C. 154(b) by 0 days.

(21) Appl. No.: 18/150,081

(22) Filed: Jan. 4, 2023

(65) Prior Publication Data
US 2023/0227143 A1    Jul. 20, 2023

Related U.S. Application Data

(60) Provisional application No. 63/285,133, filed on Dec. 2, 2021.

(51) Int. Cl.
| | |
|---|---|
| *B64B 1/62* | (2006.01) |
| *B33Y 80/00* | (2015.01) |
| *B64C 39/02* | (2023.01) |

(52) U.S. Cl.
CPC .............. *B64B 1/62* (2013.01); *B33Y 80/00* (2014.12); *B64C 39/026* (2013.01)

(58) Field of Classification Search
CPC ..... B64C 39/001; B64C 23/00; B64C 39/026; B64C 39/01; B64B 1/62; B33Y 80/00
See application file for complete search history.

(56) References Cited

U.S. PATENT DOCUMENTS

| | | | | |
|---|---|---|---|---|
| 8,308,104 | B2* | 11/2012 | Brothers | F02C 7/36 244/12.2 |
| 9,517,840 | B2* | 12/2016 | Bucheru | B64C 39/066 |
| 2003/0130131 | A1* | 7/2003 | Brotz | B64C 29/0008 244/62 |
| 2005/0205715 | A1* | 9/2005 | Hansen | B64C 27/20 244/12.1 |
| 2020/0346630 | A1* | 11/2020 | Outlaw | B64C 3/00 |

OTHER PUBLICATIONS

Marc G. Millis and Nicholas E. Thomas, Responding to Mechanical Antigravity (2006), NASA/TM pp. 3-4 (Year: 2006).*

* cited by examiner

*Primary Examiner* — Joshua J Michener
*Assistant Examiner* — Cindi M Curry (57) ABSTRACT

A method of creating aeronautical lift is described which uses a fast voltage electrostatic force to rapidly simultaneously move the top and bottom surfaces of a lifting device downward, followed by a slow voltage electrostatic force to slowly simultaneously return the top and bottom surfaces to their original positions. This cyclic movement reduces downward air pressure on the top surface of the lifting device and increases air pressure on the bottom surface of the lifting device, thus producing aeronautical lift.

17 Claims, 10 Drawing Sheets

ARTIFICIAL BUOYANCY LIFTING DEVICE USING COUPLED ELECTROSTATIC PISTONS METHOD AND APPARATUS

RELATED INVENTION

The present invention claims priority under 35 U.S.C. § 119(e) to: "Artificial Buoyancy Method and Apparatus" Provisional U.S. patent Application Ser. No. 63/285,133, filed 2 Dec. 2021.

TECHNICAL FIELD OF THE INVENTION

The present invention relates to the field of aeronautical lift. More specifically, the present invention relates to a new innovative energy efficient method of creating aeronautical lift.

RELATED INVENTIONS

The present invention relates to: "Artificial Buoyancy Method and Apparatus" Regular U.S. patent application Ser. No. 17/395,767, filed 6 Aug. 2021 and granted as U.S. Pat. No. 11,472,537 B2 on Oct. 18, 2022, which is incorporated wherein by reference.

BACKGROUND OF THE INVENTIONS

Applicant's U.S. Pat. No. 11,472,537 illustrates current flying means that create aeronautical lift with various efficiencies. It was the object of that invention to provide new, improved, compact, and efficient methods for providing aeronautical lift which could be used for a large variety of applications.

SUMMARY OF THE INVENTIONS

The lift of a helium balloon is based on the Archimedes' Principle, in which the upward buoyant force (lift) is equal to the weight of the fluid (air) displaced by the object (balloon). This is the same buoyant force that allows boats and people to float in water.

Another way to express buoyancy in air, is that the upward air pressure force on the bottom surface of an object is greater than the downward air pressure force on the top surface of the object.

To achieve the desired objects of Applicant's U.S. Pat. No. 11,472,537 invention, methods and apparatus were described that reduced air pressure on the top surface of a lifting device, below air pressure on its bottom surface.

Provisional U.S. patent Application Ser. No. 63/285,133 introduced a new method of reducing air pressure on the top surface of a lifting device, below air pressure on its bottom surface by incorporating both a top piston and bottom piston in the lifting device.

Electrostatic attraction is primarily a function of piston area, electrostatic voltage, and gap spacing between piston and grounded support plate. Lifting devices described in Applicant's U.S. Pat. No. 11,472,537 using MEMS and CMUT devices, have the advantage of very small gap spacing, which allows very low electrostatic voltages to be used. However, their disadvantage is that a large number of devices must be used to obtain a large combined piston area.

In contrast, Provisional U.S. Patent Application Ser. No. 63/285,133 describes and illustrates a lifting device implementation using dual piston areas that can be a few or many square inches in size. The high voltage required to drive these dual pistons is a function of the piston area, piston to grounded support plate electrostatic voltage gap spacing, and desired lifting force being implemented.

The primary advantages of these Artificial Buoyancy lifting device inventions are summarized as follows:

Provides an environmentally safe, friendly, and energy efficient method of generating aeronautical lift using electric power, has no external moving parts or noise (like propellers), and provides unprecedented Safety of Flight as overall lifting devices can be segmented into as many separate independent redundant lifting devices as desired.

Any required total lift can be easily implemented simply by incorporating as many standardized lifting modules as required.

By sealing the lifting devices in pressurized enclosures, the lifting devices have no altitude service ceiling.

It is the object of the present invention to modify the implementation introduced in Provisional U.S. Patent Application Ser. No. 63/285,133 to provide an even more efficient method of reducing air pressure on the top surface of a lifting device, below air pressure on its bottom surface.

Specifically, the top and bottom pistons introduced in Provisional U.S. Patent Application Ser. No. 63/285,133 are now hardware coupled together, and both pistons are driven using electrostatic attraction only, instead of using both electrostatic attraction and electrostatic repulsion.

The basic method of reducing air pressure on the top surface of a lifting device, below air pressure on its bottom surface is identical, but using electrostatic attraction only, instead of both electrostatic attraction and electrostatic repulsion, is more efficient.

Lifting devices described in Applicant's U.S. Pat. No. 11,472,537 invention were sealed in a pressurized enclosure filled with a high molecular weight gas (and suggested xenon). However, in this current invention, a more appropriate high molecular weight gas is sulfur hexafluoride (SF6) due to its high voltage breakdown properties. Large quantities of SF6 gas are currently used by the Electric Utility Industry in transformers and other high voltage equipment.

DETAILED DESCRIPTION OF THE PREFERRED EMBODIMENTS

Figure 1:
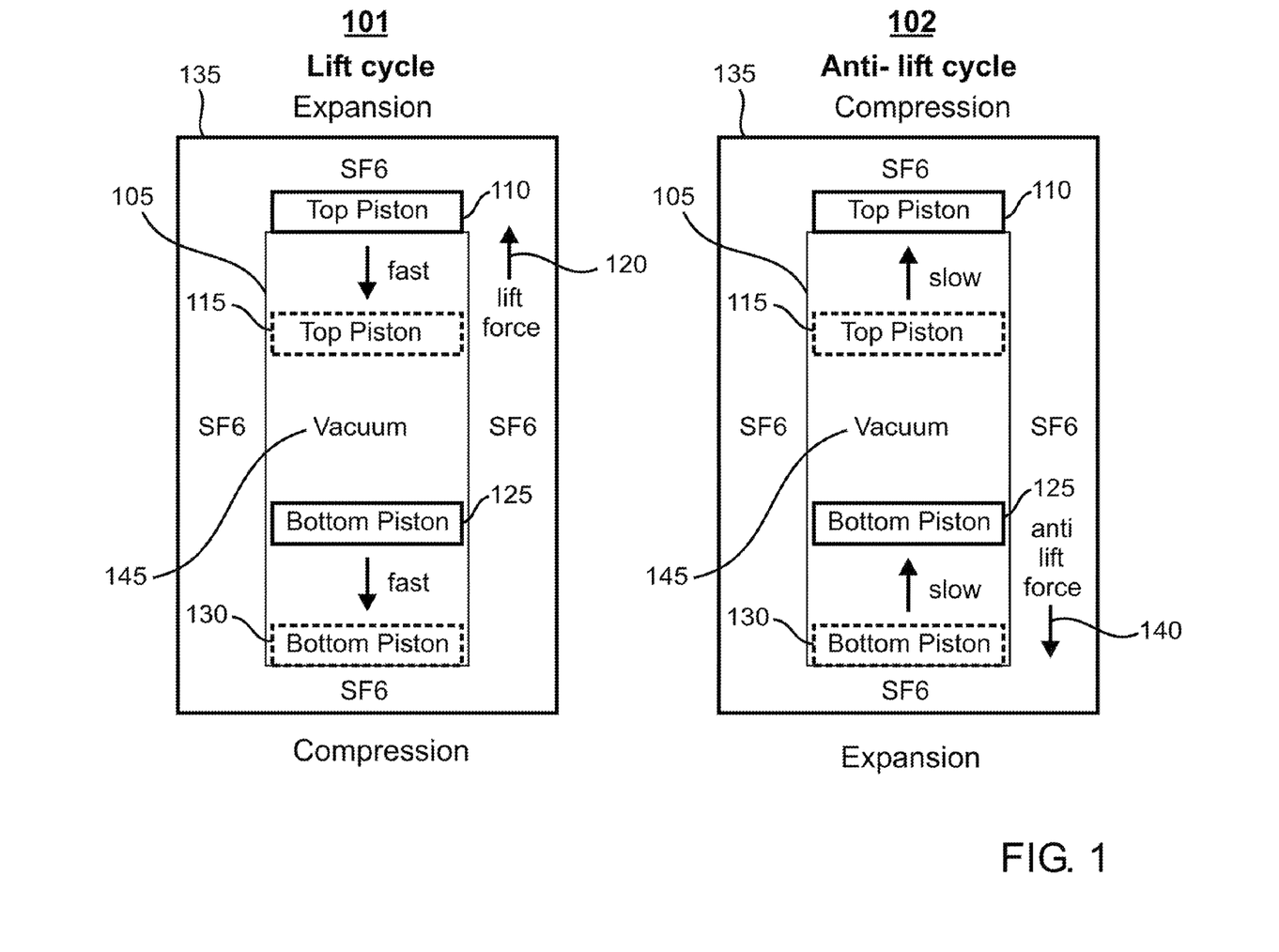
FIG. 1 illustrates a lifting device composed of a top and bottom piston which are hardware coupled together.

FIG. 1 is repeated from Provisional U.S. Patent Application Ser. No. 63/285,133 and introduces the basic concept of the current invention.

The simplified drawing in FIG. 1 illustrates lifting device 105 sealed in enclosure 135, which is filled with pressurized SF6 gas. Lifting device 105 is composed of a top piston at initial position 110 and a bottom piston at initial position 125, which are now hardware coupled together. For clarity, this hardware coupling is not illustrated in FIG. 1, nor is the grounded support plate 112 between top and bottom pistons. These components are illustrated later in FIG. 3 and FIG. 4.

The initial positions of the top and bottom pistons, at the beginning of lift cycle 101, are illustrated using a solid block, and their ending positions, at the end of lift cycle 101, are illustrated by the dashed blocks.

Top piston at initial position 110 and bottom piston at initial position 125 are initially at rest as illustrated in lift cycle 101 of FIG. 1. Downward SF6 gas pressure on top surface of top piston at initial position 110 and upward SF6 gas pressure on bottom surface of bottom piston at initial position 125 are equal, so net force on lifting device 105 is zero.

Lifting device 105 space between bottom surface of top piston at position 110 and grounded support plate 112 (illustrated in FIG. 3) is a vacuum 145. Likewise, space between top surface of bottom piston at position 130 and grounded support plate 112 (illustrated in FIG. 4) is also a vacuum 145. Therefore, there is no SF6 gas pressure on either bottom surface of top piston at position 110 or on top surface of bottom piston at position 130.

To produce lift, top piston at position 110 is rapidly moved downward to position 115, which produces a lower SF6 gas expansion pressure on top surface of top piston at position 110. Simultaneously, bottom piston at position 125 is also rapidly moved downward (by hardware coupling pins 122 illustrated in FIG. 3 and FIG. 4) to position 130, which produces a higher SF6 gas compression pressure on bottom surface of bottom piston.

Therefore, lifting device 105 produces an upward lift force 120 equal to the sum of lower expansion SF6 gas pressure on top surface of top piston and higher compression SF6 gas pressure on bottom surface of bottom piston as illustrated in Lift cycle 101 in FIG. 1.

Bottom piston at position 130 and top piston at position 115 are then simultaneously slowly returned to positions 125 and 110 respectively, as illustrated in Anti-lift cycle 102 of FIG. 1, where top piston produces a higher SF6 gas compression pressure on top surface of top piston and bottom piston produces a lower SF6 gas expansion pressure on bottom surface of bottom piston.

Therefore, lifting device 105 produces an Anti-lift force 140 equal to the sum of higher compression SF6 gas pressure on top surface of top piston and lower expansion SF6 gas pressure on bottom surface of bottom piston as illustrated in Anti-lift cycle 102 in FIG. 1.

Figure 2:
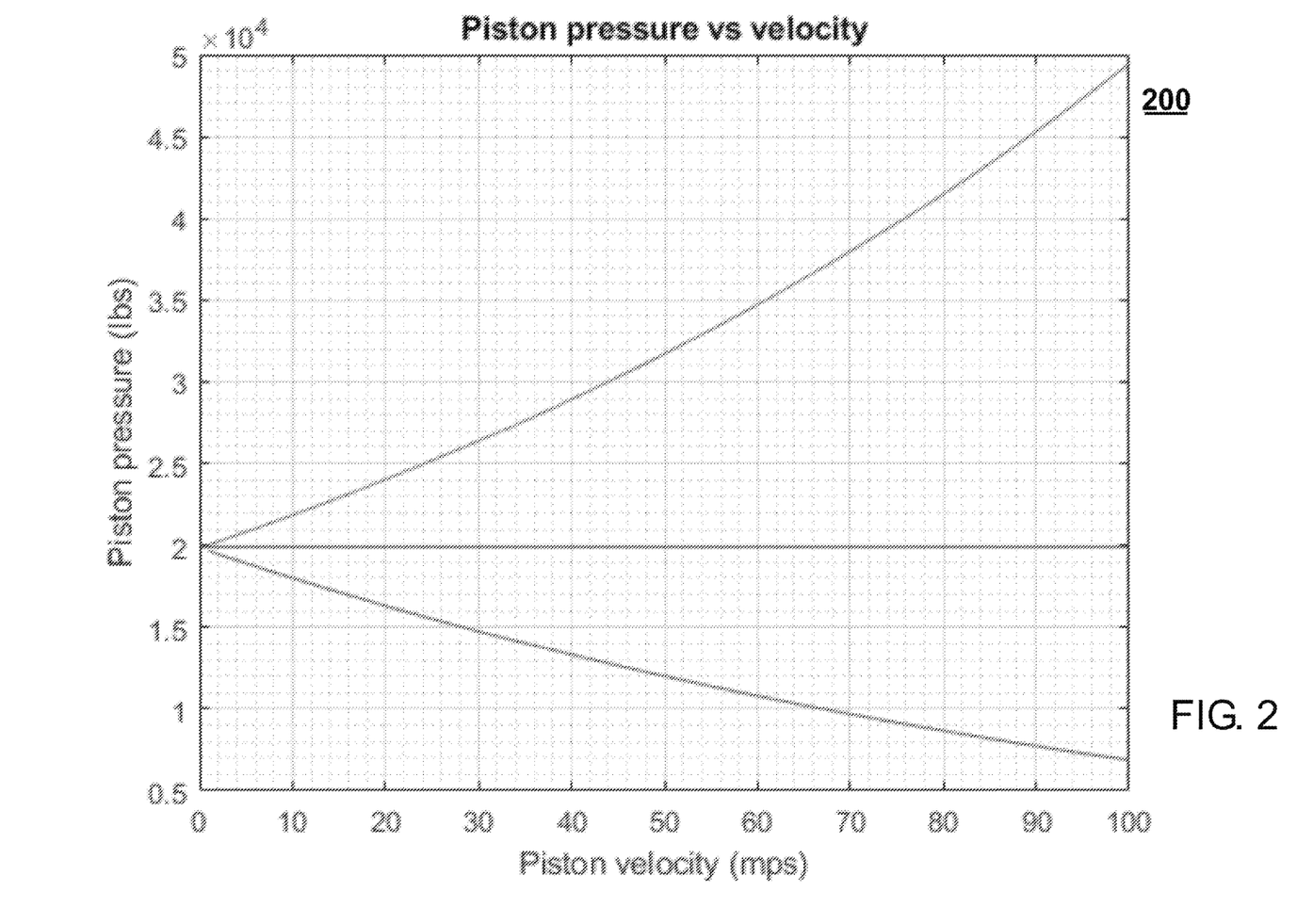
FIG. 2 plots piston pressure in pounds versus velocity in meters per second for a lifting device sealed in an enclosure filled with pressurized SF6 gas.

If the speed of both 101 Lift cycle and 102 Anti-lift cycle are equal, little or no combined lift force would be produced on lifting device 105. FIG. 2 illustrates top and bottom piston movements that are required to produce a net combined lift on lifting device 105.

Graph 200 in FIG. 2 plots piston pressure in pounds (lbs) versus velocity in meters per second (mps) from a computer simulation of a particular lifting device 105 sealed in enclosure 135 filled with pressurized SF6 gas.

Constant trace at $2 \times 10^4$ lbs is the static SF6 pressure on both top and bottom pistons when they are not moving. The bottom trace illustrates SF6 gas expansion pressure versus piston velocity. Note that in the limit (hyper-velocity), expansion pressure approaches zero (vacuum).

In contrast, top trace illustrates SF6 gas compression pressure versus piston velocity, which increases rapidly as piston velocity increases. Therefore, to create maximum lift, top and bottom piston velocities must be as high as possible during Lift cycle 101, and as slow as practical during Anti-lift cycle 102 as illustrated by the following examples.

Assume during Lift cycle 101, velocity of both pistons is 50 mps. As both pistons are hardware coupled together, FIG. 2, indicates a SF6 gas expansion pressure of $1.2 \times 10^4$ lbs is produced on top surface of top piston and a SF6 gas compression pressure of $3.2 \times 10^4$ lbs is produced on bottom surface of bottom piston. Therefore, an upward lift force 120 of $2 \times 10^4$ lbs ($3.2 \times 10^4$ lbs minus $1.2 \times 10^4$ lbs) is produced.

Assume during Anti-lift cycle 102, velocity of both pistons is 25 mps. As both pistons are hardware coupled together, FIG. 2 indicates a SF6 gas expansion pressure of $1.55 \times 10^4$ lbs is produced on bottom surface of bottom piston and a SF6 gas compression pressure of $2.5 \times 10^4$ lbs is produced on top surface of top piston. Therefore, a downward Anti-lift force 140 of $0.95 \times 10^4$ lbs ($2.5 \times 10^4$ lbs minus $1.55 \times 10^4$ lbs) is produced.

However, since Anti-lift cycle 102 takes twice as long as Lift cycle 101, the net combined lift per each combined Lift cycle 101 and Anti-lift cycle 102 is 1000 lbs ($2 \times 10^4$ lbs – $2 * 0.95 \times 10^4$ lbs).

In contrast, assume during Lift cycle 101, the velocity of both pistons is 100 mps and during Anti-lift cycle 102, the velocity of both pistons is 50 mps. Performing the same calculations as before, the net lift per each Lift cycle 101 and Anti-lift cycle 102 is 2000 lbs.

Lifting device 105 can be circular, square, or any other shape depending on the specific aeronautical lift application. However, the most appropriate shape of lifting device 105, for most applications, is circular.

Figure 3:
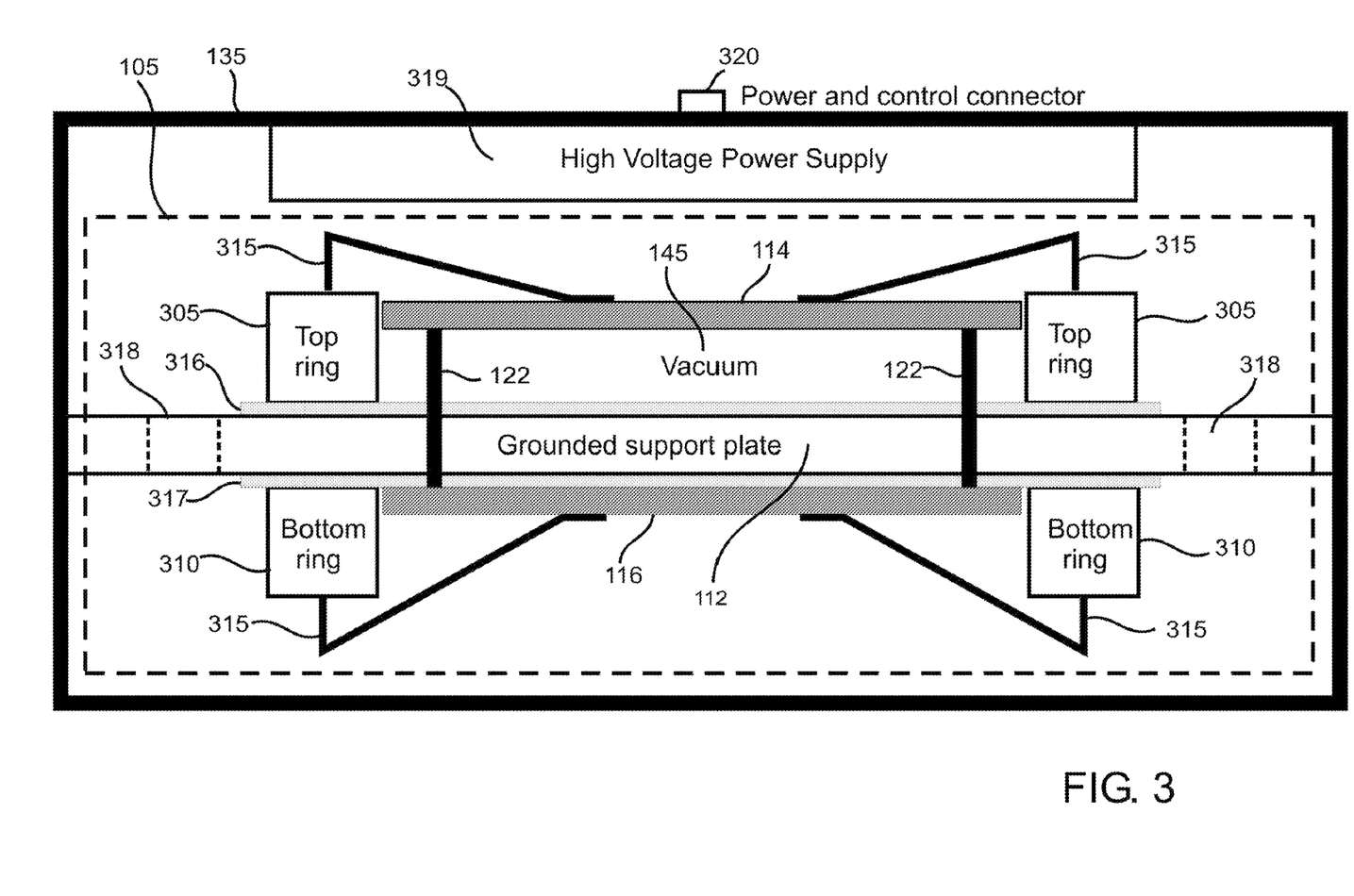
FIG. 3 illustrates a cross sectional view of a hardware implementation of FIG. 1 double piston lifting device for Lift cycle 101 illustrated in FIG. 1.
Figure 4:
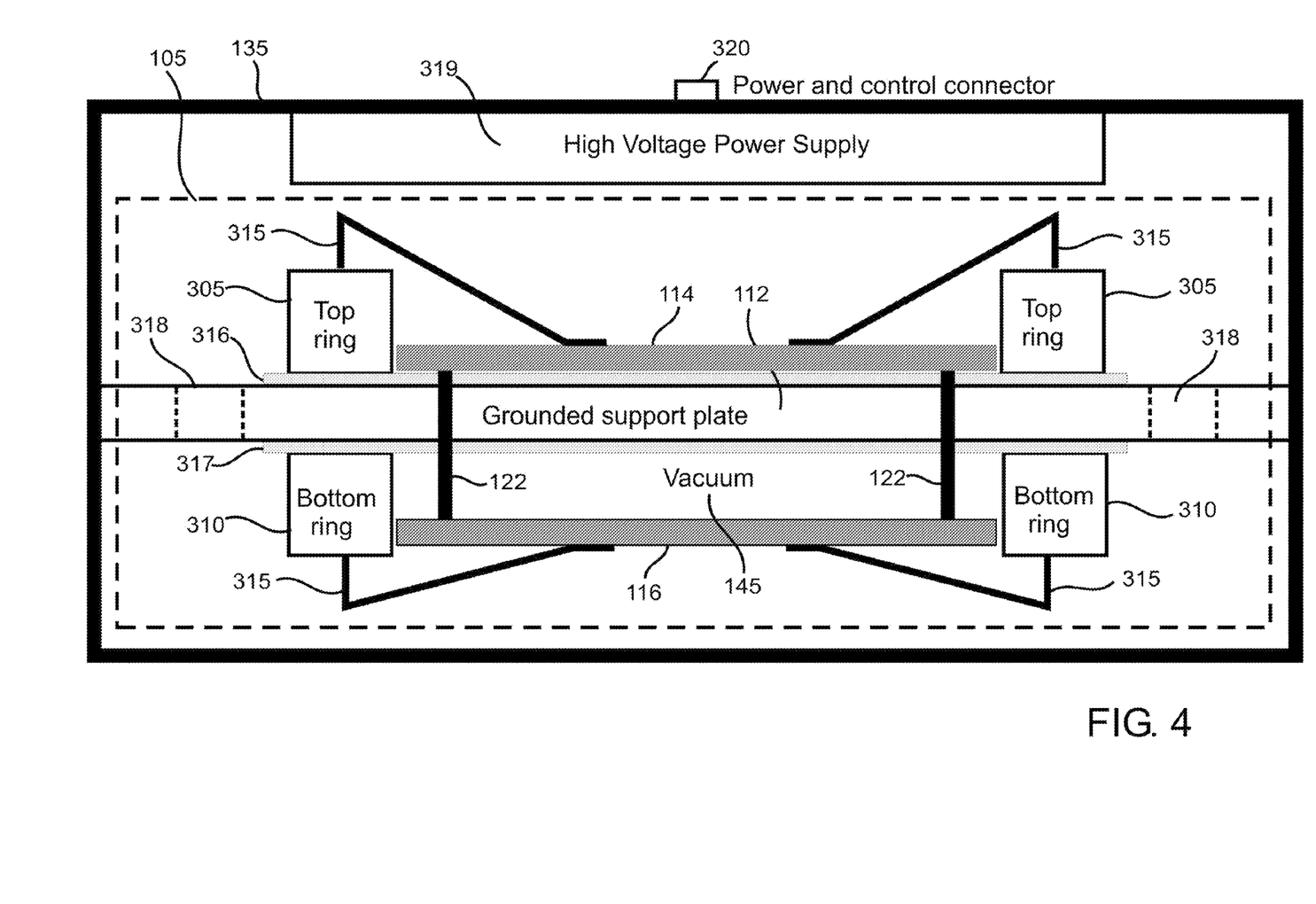
FIG. 4 illustrates a cross sectional view of a hardware implementation of FIG. 1 double piston lifting device for Lift cycle 102 illustrated in FIG. 1.

Using the same nomenclature as Lift cycle 101 and Anti-lift cycle 102 in FIG. 1, a cross sectional view of a hardware implementation of a double piston lifting device 105 sealed in pressurized SF6 gas enclosure 135, is illustrated in FIG. 3 for Lift cycle 101 and is illustrated in FIG. 4 for Anti-lift cycle 102.

Note that the top and bottom pistons, introduced in Provisional U.S. Patent Application Ser. No. 63/285,133, are now hardware coupled together using hardware coupling pins 122.

Also, both pistons are now driven using piston electrostatic attraction to grounded support plate 112, instead of using both electrostatic attraction and repulsion as was described in Provisional U.S. Patent Application Ser. No. 63/285,133.

FIG. 3 illustrates a round top piston 114, at initial Lift cycle 101 position 110, coupled to a round bottom piston 116 at initial position 125, as was illustrated in FIG. 1. The top and bottom pistons are coupled together using multiple hardware coupling pins 122.

The inside diameter of round metal top ring 305 is slightly larger than outside diameter of round metal top piston 114. The 3-fold purpose of metal top ring 305 is to guide the movement of top piston 114, prevent compressed SF6 gas from flowing into vacuum space 145 between top piston 114 bottom surface and grounded support plate 112, and to apply high voltage through one or more conductive spring pins 315 to top piston 114. Non-conductive insulator 316 prevents shorting out applied high voltage between top ring 305 and top piston 114 from grounded support plate 112. Insulator material 316 could consist of a disc of Teflon or other suitable material.

FIG. 4 illustrates round bottom piston 116, at initial Anti-lift cycle 102 position 130, coupled to round top piston 114 at initial position 115, as was illustrated in FIG. 1. The top and bottom pistons are coupled together using multiple hardware coupling pins 122.

As in FIG. 3, the inside diameter of round metal bottom ring 310 is slightly larger than outside diameter of round metal bottom piston 116. The 3-fold purpose of metal bottom ring 310 is identical to that of top ring 305. That is, to guide the movement of bottom piston 116, prevent compressed SF6 gas from flowing into vacuum 145 space between bottom piston 116 top surface and grounded support plate 112, and to apply high voltage through one or more conductive spring pins 315 to bottom piston 116. Non-conductive insulator 317 prevents shorting out applied high voltage between bottom ring 310 and bottom piston 116 from grounded support plate 112. Insulator material 317 could also consist of a disc of Teflon or other suitable material.

Lifting device 105 space below bottom of top piston 114 and above top of bottom piston 116 is a vacuum 145, so there is no SF6 gas pressure on either bottom surface of top piston 114 or on top surface of bottom piston 116.

Lifting device 105 is attached to pressured gas enclosure 135 using round grounded support plate 112 which contains multiple vent holes 318 around its outer circumference, which allows SF6 gas to freely flow throughout pressurized enclosure 135 and provides a uniform gas pressure on both pistons.

To produce Lift cycle 101 in FIG. 1, top metal support ring 305 is connected to a positive high voltage source. This high voltage is connected to top piston 114 via a series of metal spring clips 315 which attracts top piston 114 downward towards grounded metal support plate 112 by electrostatic attraction (to position 115), as illustrated in lift cycle 101 in FIG. 1.

No high voltage source is connected to bottom piston 116 via bottom ring 310 and metal spring clips 315. Hardware pins 122 between top piston 114 and bottom piston 116 pushes bottom piston 116 downward from position 125 to position 130 as illustrated in Lift cycle 101 in FIG. 1.

To produce Lift cycle 102, bottom metal support ring 310 is connected to a positive high voltage source. This high voltage is connected to bottom piston 116 via a series of metal spring clips 315. This high voltage attracts bottom piston 116 upward towards grounded metal support plate 112 by electrostatic attraction (to position 125), as illustrated in lift cycle 102 in FIG. 1.

No high voltage source is connected to top piston 114 via top ring 305 and metal spring clips 315. Hardware pins 122 between bottom piston 116 and top piston 114 pushes top piston 114 upward from position 115 to position 110 as illustrated in Anti-lift cycle 102 in FIG. 1.

Figure 5:
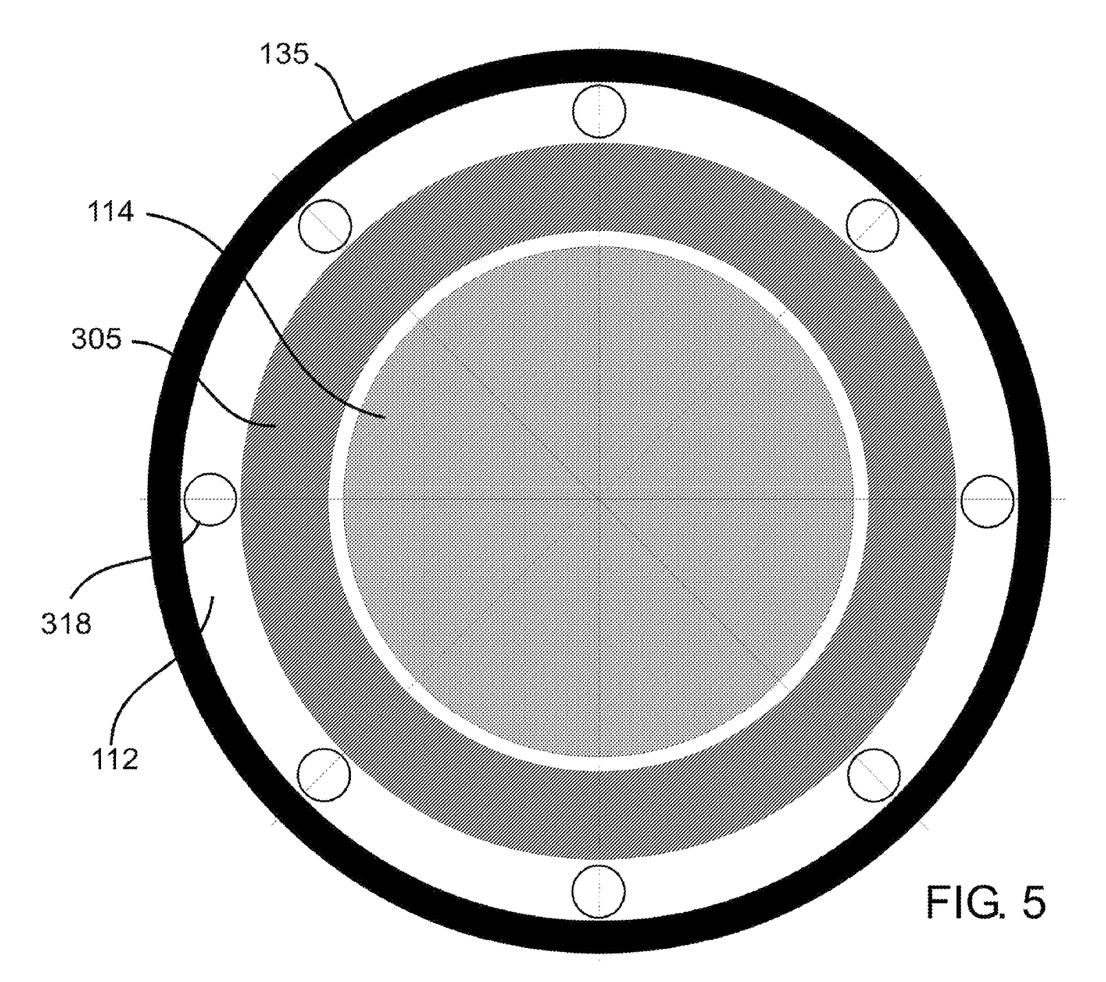
FIG. 5 illustrates a top view of FIG. 3 components.

A top view of FIG. 3 components (round top piston 114, round metal top ring 305, round grounded support plate 112 which contains multiple vent holes 318 around its outer circumference, and round pressurized enclosure 135) are illustrated in FIG. 5.

It is important to maintain vacuum 145 below top piston 114 and grounded support plate 112 in FIG. 3 so as to not impede the downward velocity of top piston 114.

It is also important to maintain vacuum 145 above bottom piston 116 and grounded support plate 112 in FIG. 4 so as to not impede the upward velocity of bottom piston 116.

An optimum solution to maintain vacuum 145 is to implement a method that connects vacuum 145 space to a vacuum pump. This would continuously maintain vacuum 145.

Figure 6:
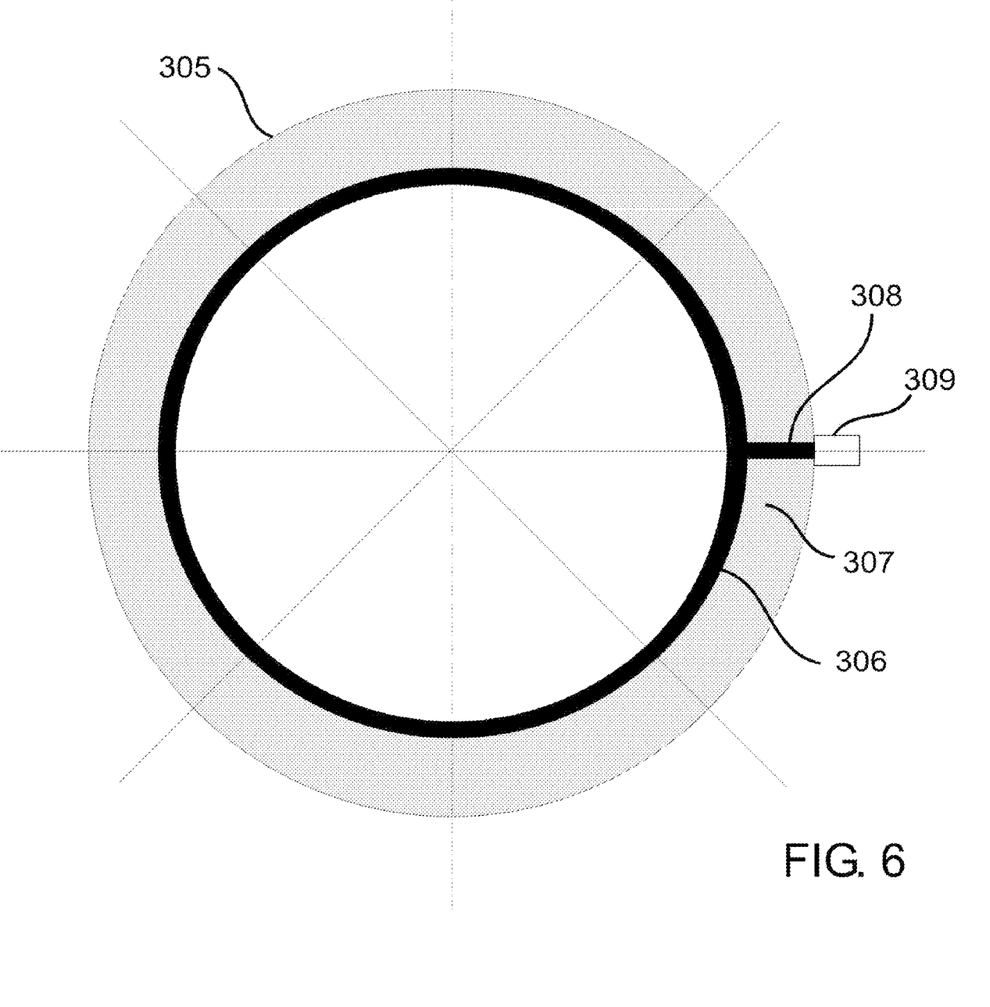
FIG. 6 illustrates a top view for implementing a method that connects vacuum 145 space in FIG. 3 and FIG. 4 to a vacuum pump.

A potential vacuum pump implementation to maintain vacuum 145 in both FIG. 3 and FIG. 4 is illustrated in FIG. 6. The solution is to machine a small grove 306 on the inside circumference of the grounded support plate 112 side of both top ring 305 and bottom ring 310.

For example, if the inside diameter of both rings were 8 inches and 0.5 inches thick, grove 306 might be 0.2 inches wide and 0.1 inches deep. This grove, along with a machined channel path 308, would provide a SF6 gas path from vacuum 145 volumes to an exhaust port coupling 309, which is contacted to a vacuum pump (not shown). A single vacuum pump could service multiple lifting devices to collect leaked SF6 gas from vacuum 145 spaces. This SF6 gas could then be pumped back into enclosures 135 of multiple lifting devices.

The net combined lift per each combined Lift cycle 101 and Anti-lift cycle 102 period is a function of top piston 114 and bottom piston 116 velocities. These velocities are controlled by the magnitudes of the high voltages used during Lift cycle 101 and Anti-lift cycle 102. The voltage used during Anti-lift cycle 102 is called the Slow Voltage and the voltage used during Lift cycle 101 is called the Fast Voltage.

To predict the net combined lift per each combined Lift cycle 101 and Anti-lift cycle 102 period, a computer simulation program was written that calculated the combined lift as a function of the Slow and Fast Voltages applied during Anti-lift cycle 102 and Lift cycle 101 respectively. As lift produced is a function of both Slow Voltage and Fast Voltage, multiple different combinations of these voltages can produce the same lift.

Figure 7:
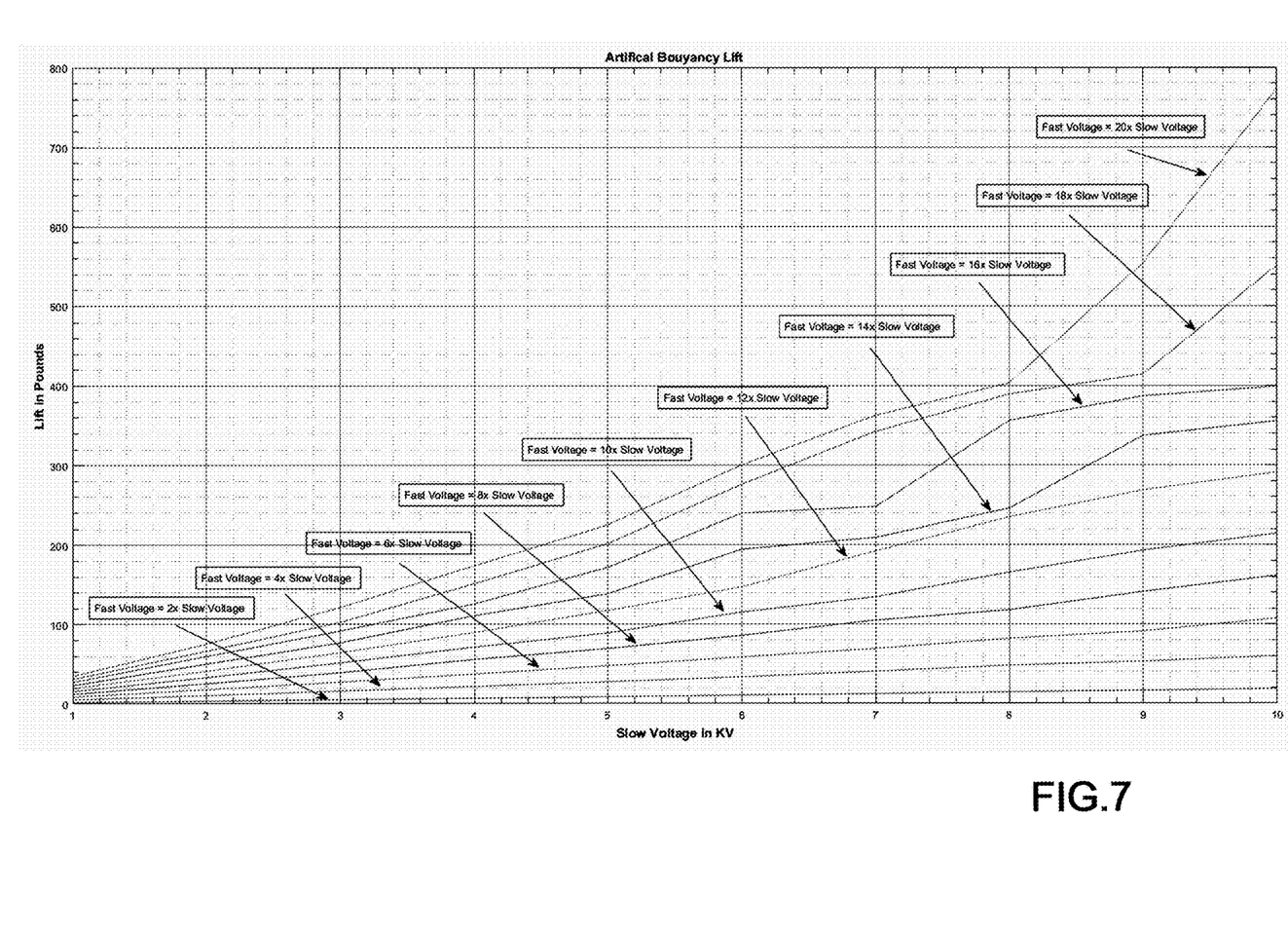
FIG. 7 illustrates a 2D graph that predicts aeronautical lift in FIG. 3 and FIG. 4 as a function of Slow and Fast Voltages.

To avoid presenting the results of this simulation in a 3D chart or graph, an easy to understand 2D graph is presented in FIG. 7 that provides insight into the effect on lift as a function of the selected Slow and Fast Voltages.

To determine the required Slow Voltage and Fast Voltage, first select the desired Lift and Slow Voltage. The choice of required Fast Voltages is indicated by the intersection of the horizontal Lift line and a Fast Voltage curve at the vertical Slow Voltage line.

For example, 200 lbs of lift can be produced using a 4.5 KV Slow Voltage and Fast Voltage=20× Slow Voltage curve. Since the selected Slow Voltage is 4.5 KV, the required Fast Voltage is 20× Slow Voltage=20×4.5 KV=90 KV.

Another Slow Voltage and Fast Voltage choice for 200 lbs of lift is a 7.2 KV Slow Voltage and Fast Voltage=12× Slow Voltage curve. Since the selected Slow Voltage is 7.2 KV, the required Fast Voltage is 12× Slow Voltage=12×7.2 KV=86.4 KV. Any other combination that intersects the graph's 200 lbs horizontal Lift line and a Fast Voltage curve at the vertical selected Slow Voltage line will produce the desired 200 lbs of lift.

There are numerous ways to design circuits to produce the High Voltage (HV) Slow and Fast Voltages predicted in FIG. 7. However, since external circuits require heavy highly insulated cable, the optimum implementation is to place HV circuit 319 inside sealed enclosure 135, which is filled with pressurized SF6 gas, as illustrated in FIG. 3 and FIG. 4. In this way, only lightweight Low Voltage (LV) cables are required via power and control connector 320 to operate lifting device 105. Since SF6 gas is an excellent HV insulator, no additional insulation is required between printed wiring board components in the design of HV circuit boards in a SF6 gas environment.

The Slow and Fast Voltages predicted in FIG. 7 depend on the size and weight of the top and bottom pistons illustrated in FIG. 3 and FIG. 4. It is important to make these pistons as lightweight as possible so they will accelerate rapidly and obtain high speed during electrostatic attraction between the piston and grounded support plate. As this electrostatic attraction is uniform over the entire area of the piston, even a very thin piston will not warp, bend, or distort when the Slow or Fast Voltages predicted in FIG. 7 are applied.

However, this is not the case for the non-energized piston being pushed by multiple hardware coupling pins 122 of the energized piston. That is, when bottom piston 116 is being pushed by top piston 114 in FIG. 4 or when top piston 114 is being pushed by bottom piston 116 in FIG. 3. It is therefore important to make the pistons as stiff and lightweight as possible.

One method to stiffen the pistons, without adding weight, is to fabricate them out of titanium, which is one of the lightest and stiffest metals. Another method is to add thin ribs to the top side of top piston 114 and to the bottom side of bottom piston 116 as illustrated in FIG. 8.

Figure 8:
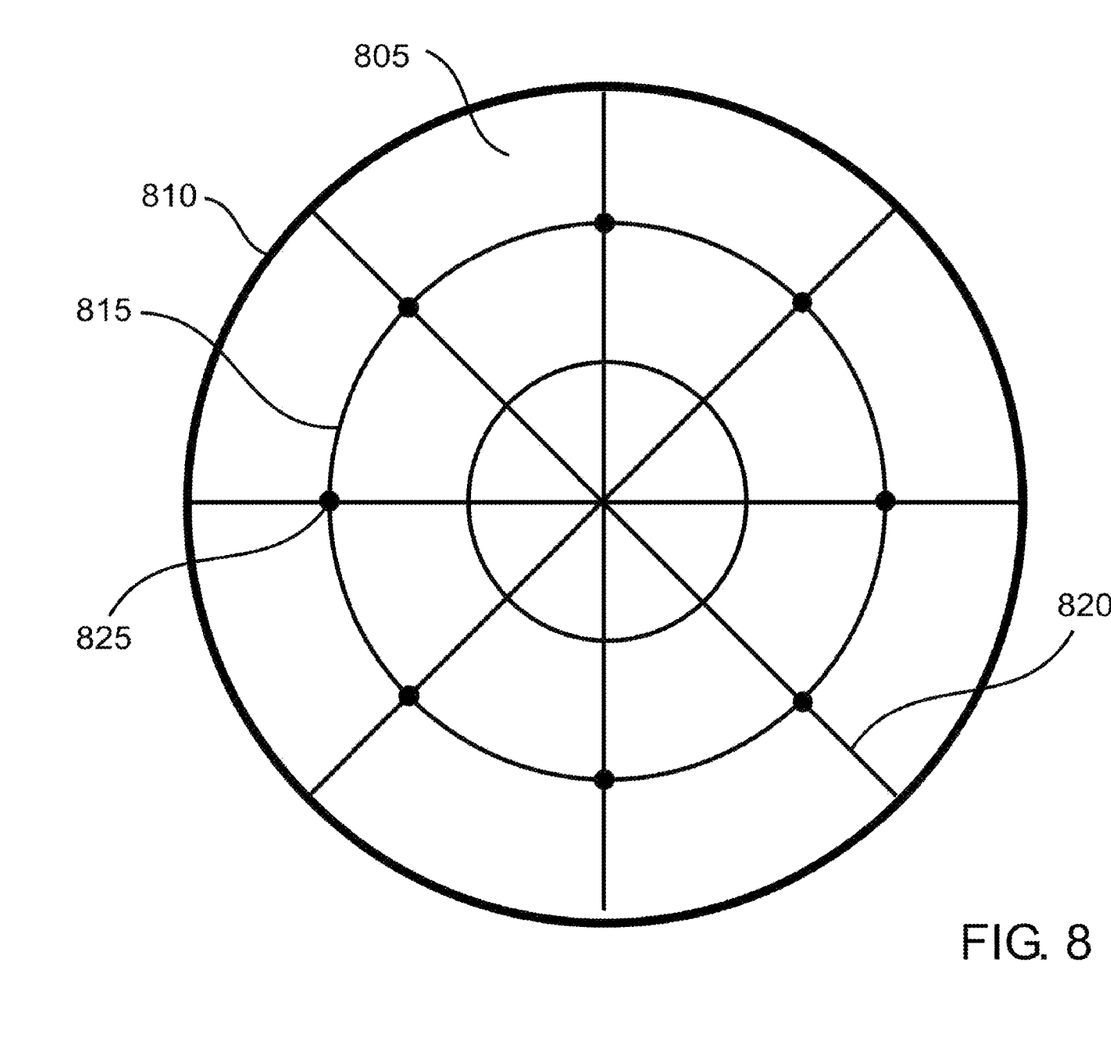
FIG. 8 illustrates a top view of a method to stiffen both top and bottom pistons in FIG. 3 and FIG. 4.

FIG. 8 illustrates a top view of the piston side opposite grounded support plate 112. That is, when top piston 114 is energized, its smooth non-ribbed side makes contact with insulator 316. Likewise, when bottom piston 116 is energized, its smooth non-ribbed side makes contact with insulator 317.

In FIG. 8, outer edge of ribbed side of piston 805 contains circular rib 810, additional circular ribs 815, radial ribs 820, and small round thickness increases 825 at multiple hardware coupling pins 122 positions.

As lifting device 105 in FIG. 1 can be fabricated in numerous shapes other than round, as presented in this patent application, another method of fabricating lifting device pistons is via 3D printing. In this way, shape, thickness, ribs, or other properties can be customized specifically for the lifting device application.

Applicant's U.S. Pat. No. 11,472,537 "Artificial Buoyancy Method and Apparatus" described Lifting device methods using MEMS and CMUT devices, which created lift by rapidly moving a portion of the lifting device top surface downward, so as to reduce air pressure on lifting device top surface below air pressure on lifting device bottom surface.

Using MEMS and CMUT devices with a large membrane (to maximize lift) requires a strong restoring spring function prior to this downward movement, so as to prevent ambient air pressure from pushing the membrane down into the air gap and thus reducing displacement.

To overcome this problem, Applicant invented, described, and illustrated a Double PCMUT cell with substrate-embedded springs, called a DPCMUT cell, in which two movable surfaces are implemented and connected together using rigid members.

This DPCMUT cell is described in detail and illustrated in FIG. 17 of Applicant's U.S. Pat. No. 11,472,537 in which Pulse 1 generator 1740 output 1750 moves both upper rigid top plate 1720 and lower rigid top plate 1733 downward. Pulse 2 generator 1745 output 1755 moves both upper rigid top plate 1720 and lower rigid top plate 1733 upward. This implementation reduces (or eliminates) the requirement for a strong restoring spring function prior to downward movement of the two movable surfaces.

Figure 9:
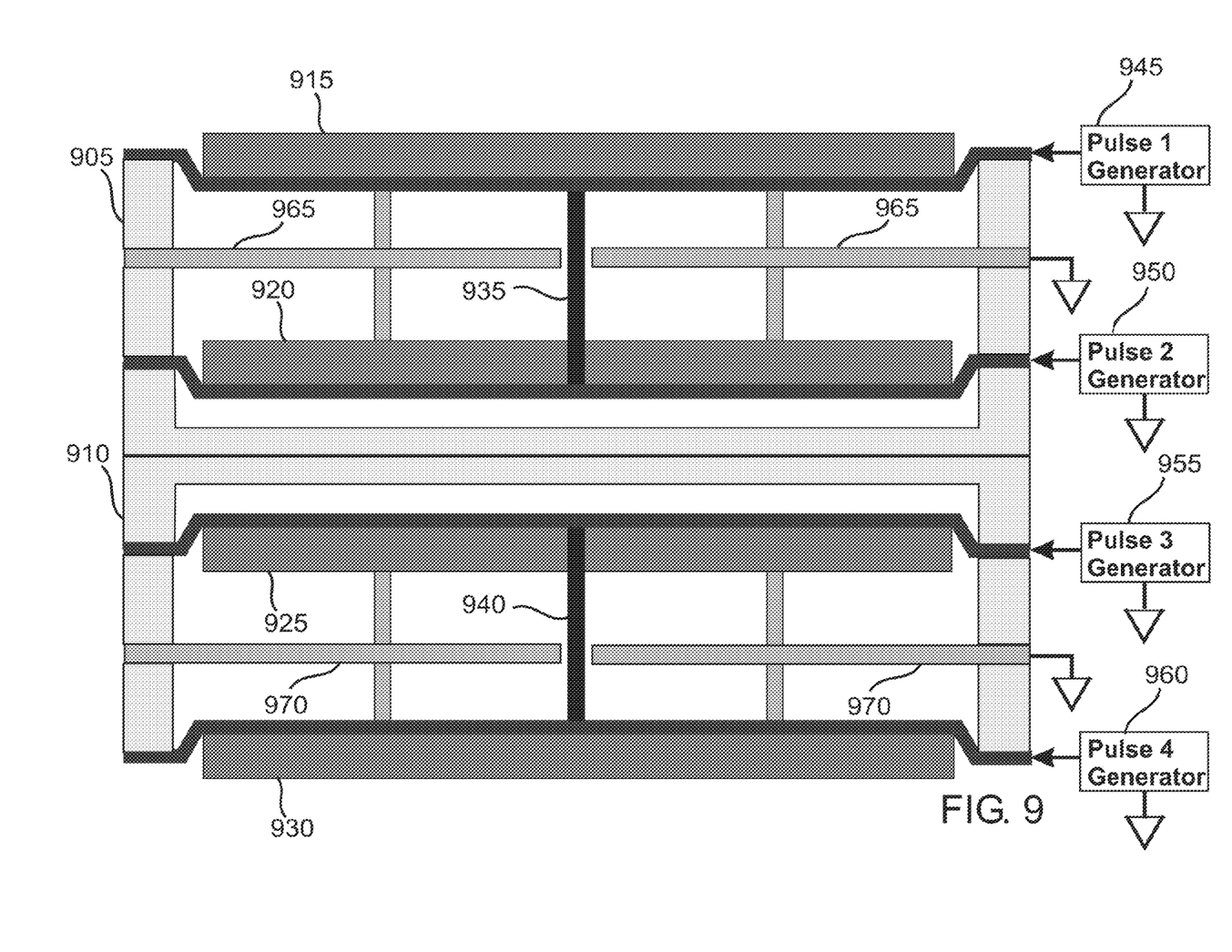
FIG. 9 illustrates connecting an upward pointing MEMS DPCMUT device to a downward pointing MEMS DPCMUT device to create a lifting device composed of a top and bottom piston.

Since this DPCMUT cell has the ability to move the upper rigid top plate both upward and downward, two DPCMUT cells can be simply mounted together, so that an upward pointing DPCMUT cell 905 is mounted with an identical downward pointing DPCMUT cell 910, as illustrated in FIG. 9.

This allows MEMS DPCMUT devices to be used to create aeronautical lift as is described in this current invention, which uses a Fast Voltage electrostatic force to rapidly simultaneously move top and bottom surfaces of a lifting device downward, followed by a Slow Voltage electrostatic force to slowly simultaneously return top and bottom surfaces of a lifting device to their original initial positions.

Using these back-to-back DPCMUT devices, the same Lift cycle 101 and Anti-lift cycle 102 are implemented in FIG. 9 as were implemented in FIG. 1, FIG. 3, and FIG. 4. The only difference in FIG. 9 is the sequence of Pulse Generator 1 through Pulse Generator 4 voltage steps to implement the same Lift cycle 101 and Anti-lift cycle 102.

The voltage sequence steps to implement Lift Cycle 101 is defined below:

"To produce Lift cycle 101 in FIG. 1, upper rigid top plate 915 of upward pointing DPCMUT cell 905 is rapidly moved downward via electrostatic attraction between upper rigid top plate 915 and grounded element 965, using Pulse 1 Generator 945. This produces a lower SF6 gas expansion pressure on upward pointing DPCMUT cell 905.

Simultaneously, upper rigid top plate 930 of downward pointing DPCMUT cell 910 is rapidly moved downward via electrostatic attraction between lower rigid bottom plate 925 and grounded element 970, using Pulse 3 Generator 955. Lower rigid bottom plate 925 pushes upper rigid top plate 930 via rigid member 940. This produces a higher SF6 gas compression pressure on downward pointing DPCMUT cell 910."

The voltage sequence steps to implement Anti-lift cycle 102 is defined below:

"To produce Lift cycle 102 in FIG. 1, upper rigid top plate 930 of downward pointing DPCMUT cell 910 is slowly moved upward via electrostatic attraction between upper rigid top plate 930 and grounded element 970, using Pulse 4 Generator 960. This produces a lower SF6 gas expansion pressure on downward pointing DPCMUT cell 910.

Simultaneously, lower rigid bottom plate 920 of upward pointing DPCMUT cell 905 is slowly moved upward via electrostatic attraction between lower rigid bottom plate 920 and grounded element 965, using Pulse 2 Generator 950. Lower rigid bottom plate 920 pushes upper rigid top plate 915 upward via rigid member 935. This produces a higher SF6 gas compression pressure on upward pointing DPCMUT cell 905.

That is, both upper rigid top plate 915 of upward pointing DPCMUT cell 905 and upper rigid top plate 930 of downward pointing DPCMUT cell 910 have been returned to their original initial positions".

The ability to use MEMS DPCMUT devices to create aeronautical lift as is described in this current invention is important because MEMS devices are small, only require low voltage power supplies for the Slow and Fast Voltages, can be batch fabricated in large quantities, and multiple devices can be assembled to produce essentially any lifting device shape desired.

For low altitude aeronautical applications, these MEMS DPCMUT lifting devices need not be sealed in pressurized SF6 enclosures. Instead, they could be used directly in a normal atmospheric pressure environment, which simplifies their construction and makes many additional aeronautical lift uses possible.

For example, a large number of small MEMS DPCMUT devices could be mounted in an enclosure designed to be worn by an individual, and used to either reduce weight on the legs of a handicapped individual or to lift an individual off the ground and into the air. Potential wearable enclosures could be similar in style to a comfortable snug fitting vest, life preserver, coat, jacket, or the like.

Figure 10:
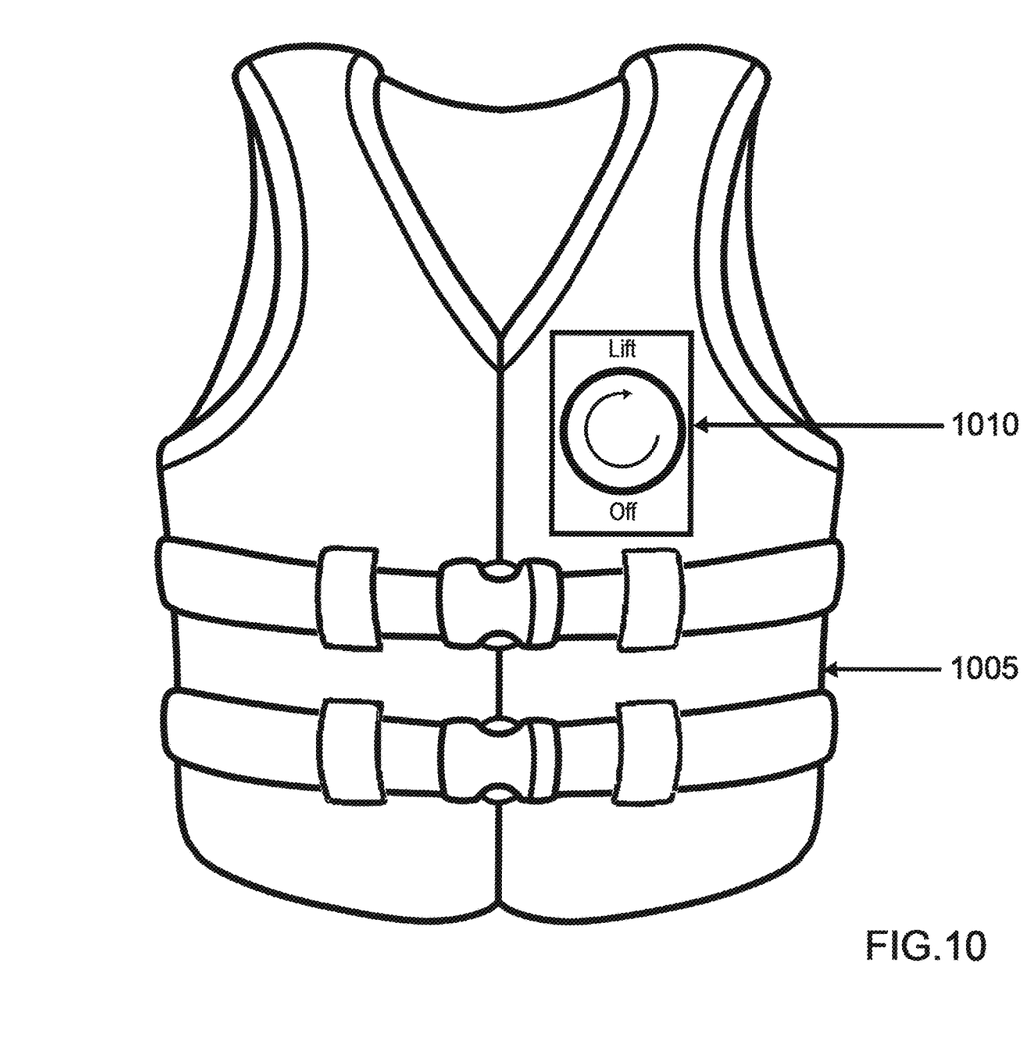
FIG. 10 illustrates mounting a large number of small MEMS DPCMUT devices in an enclosure designed to be worn by an individual.

In its simplest form, the enclosure would only require a single control to turn it on and set desired lift, as illustrated in FIG. 10, in which a life preserver styled enclosure 1005 is combined with a user control box 1010.

A 180 pound person might select lift as 100 pounds, which would reduce weight on their legs to 80 pounds, which is still sufficient to walk normally with much less effort.

For handicapped individual applications, wearable enclosures would most likely be customized for the specific individual, as is the normal case for leg, arm, and other handicapped devices. The ability to customize wearable enclosures is a key advantage of using MEMS DPCMUT devices to create aeronautical lift, as their small size allows them to be arranged into any configuration required.

Setting lift to any value over 180 pounds would actually lift the individual off the ground and into the air, and possibility allow directional flight by varying arm and leg positions. If not, additional MEMS DPCMUT devices, could be slightly orientated inside the enclosure towards the person's front, back, and side directions. Additional pilot controls could then be added for full directional flight control.

Although the preferred embodiments of the invention have been illustrated and described in detail, it will be readily apparent to those skilled in the art that various modifications may be made therein without departing from the spirit of the invention.

This is especially true due to the fact that this Artificial Buoyancy technology is applicable to many different aeronautical lift applications as was described earlier in Applicant's U.S. Pat. No. 11,472,537 B2.

What is claimed is:

1. A method of operating an aeronautical device by simultaneously reducing downward air pressure on a top surface of a lifting device and increasing air pressure on a bottom surface of said lifting device, said method comprising:
   simultaneously moving said top surface and said bottom surface of said lifting device downward at a first rate; and
   simultaneously moving said top surface and said bottom surface of said lifting device upward at a second rate; wherein said first rate is faster than said second rate;
   further comprising:
   fabricating said top surface of said lifting device as a top piston;
   fabricating said bottom surface of said lifting device as a bottom piston;
   fabricating a grounded support plate between said top piston and said bottom piston of said lifting device;
   connecting said top piston and said bottom piston of said lifting device together, said connecting to cause said top piston and said bottom piston of said lifting device to move together;
   applying a first voltage to said top piston, said first voltage being sufficient to cause a downward electrostatic attraction between said top piston and said grounded support plate;
   removing said first voltage from said top piston;
   applying a second voltage to said bottom piston, said second voltage being sufficient to cause an upward electrostatic attraction between said bottom piston and said grounded support plate;
   removing said second voltage from said bottom piston; and
   repeatedly applying and removing said first voltage to said top piston and said second voltage to said bottom piston; wherein the first voltage is different than the second voltage; and
   maintaining a vacuum between bottom side of said top piston and said grounded support plate and between top side of said bottom piston and said grounded support plate.

2. The method as in claim 1 further comprising: fabricating said top piston and said bottom piston from titanium.

3. The method as in claim 1 further comprising:
   fabricating a plurality of ribs on top side of said top piston and on bottom side of said bottom piston, said ribs designed to stiffen said top piston and said bottom piston.

4. The method as in claim 1 additionally comprising: mounting one or more said lifting devices on an object to be lifted, wherein said top surface of said plurality of said lifting devices are pointing in direction of desired said aeronautical lift.

5. The method as in claim 1 additionally comprising: placing said lifting device in a sealed enclosure;
   filling said sealed enclosure with a gas; and
   maintaining said gas in said sealed enclosure at a constant specified pressure.

6. The method as in claim 5 additionally comprising:
   maintaining said gas in said sealed enclosure at a constant specified temperature.

7. The method as in claim 5 additionally comprising:
   selecting said gas in said sealed enclosure whose molar mass is higher than molar mass of standard atmosphere air.

8. The method as in claim 5 additionally comprising:
   selecting said gas in said sealed enclosure to be sulfur hexafluoride (SF6).

9. The method as in claim 8 additionally comprising:
   mounting a power supply in said sealed enclosure.

10. The method as in claim 1 further comprising:
    mounting a plurality of upward pointing Double Post Capacitive Micromachined Ultrasonic Transducer (DPCMUT) cells on said top surface of said lifting device; and
    mounting a plurality of downward pointing DPCMUT cells on said bottom surface of said lifting device.

11. The method as in claim 10 additionally comprising:
    placing said lifting device in a sealed enclosure;
    filling said sealed enclosure with a gas; and
    maintaining said gas in said sealed enclosure at a constant specified pressure.

12. The method as in claim 11 additionally comprising:
    maintaining said gas in said sealed enclosure at a constant specified temperature.

13. The method as in claim 11 additionally comprising:
    selecting said gas in said sealed enclosure whose molar mass is higher than molar mass of standard atmosphere air.

14. The method as in claim 11 additionally comprising:
selecting said gas in said sealed enclosure to be sulfur hexafluoride (SF6).

15. The method as in claim 10 additionally comprising: mounting said lifting device inside an enclosure, said enclosure designed to be worn by an individual; pointing said top surface of said lifting devices in a first direction; providing a control for said individual to set a desired lift force; and adjusting said lifting device to a desired lift force.

16. The method as in claim 15 wherein said enclosure is selected from the group consisting of: a vest, life preserver, coat, or jacket.

17. The method as in claim 1 further comprising:
fabricating lifting device pistons via 3D printing.

* * * * *